(No Model.)
C. L. BRONK.
BENCH DOG.
No. 504,962. Patented Sept. 12, 1893.
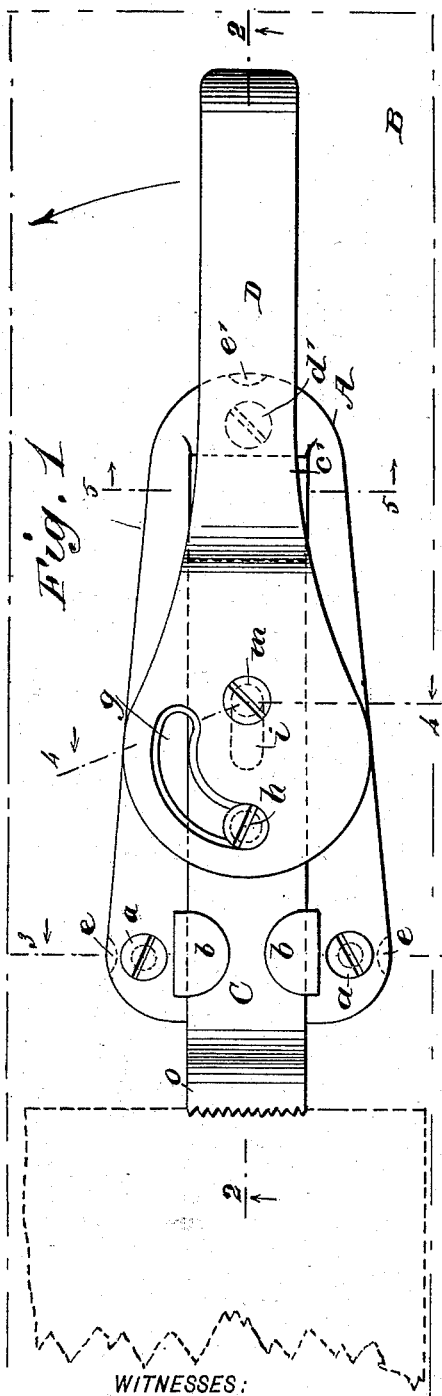
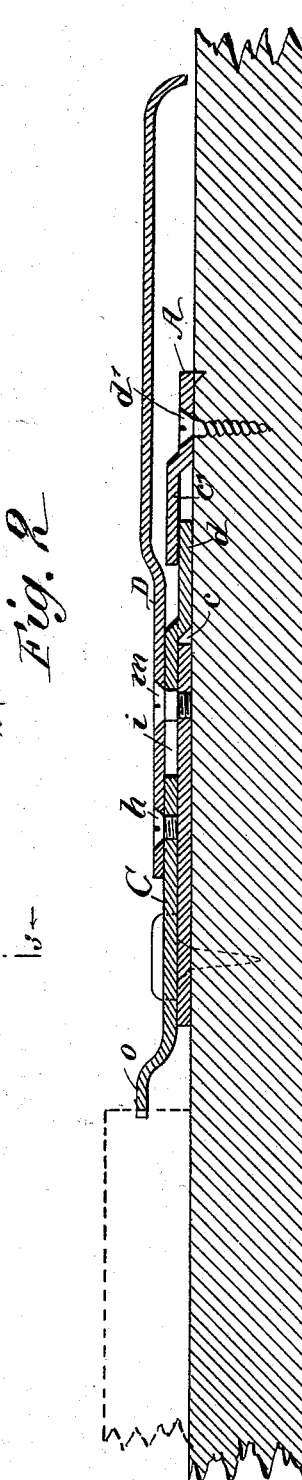
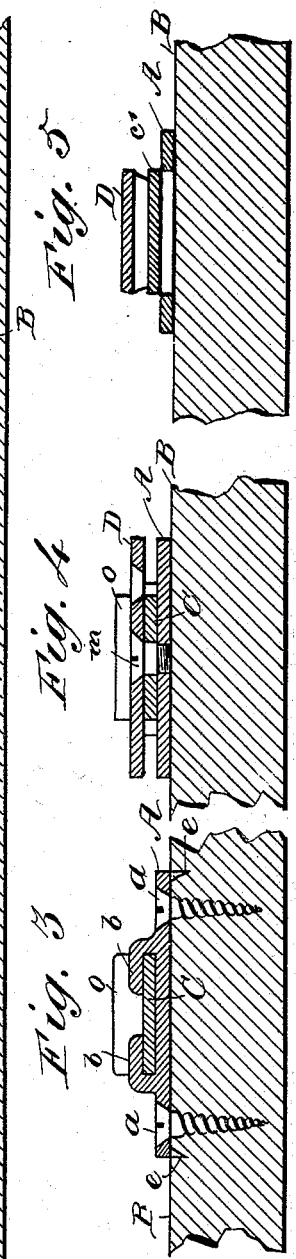
WITNESSES:
C. Neveux
C. Sedgwick
INVENTOR
C. L. Bronk
BY
Munn & Co.
ATTORNEYS.

UNITED STATES PATENT OFFICE.

CHARLES L. BRONK, OF NEW YORK, N. Y.

BENCH-DOG.

SPECIFICATION forming part of Letters Patent No. 504,962, dated September 12, 1893.

Application filed May 2, 1893. Serial No. 472,742. (No model.)

*To all whom it may concern:*

Be it known that I, CHARLES L. BRONK, of New York city, in the county and State of New York, have invented a new and useful Improved Bench-Dog, of which the following is a full, clear, and exact description.

This invention relates to an improved device for the use of wood workers, to lock a piece of wooden material on a work bench while it is planed or otherwise operated upon to render it smooth and true; the objects being, to provide a novel, simple and efficient device of the type indicated, which will be inexpensive to manufacture, and that will be reliable and convenient in use.

To these ends, my invention consists in the construction and combination of parts, as is hereinafter described and claimed.

Reference is to be had to the accompanying drawings forming a part of this specification, in which similar letters of reference indicate corresponding parts in all the figures.

Figure 1 is a plan view of the improved bench dog adjusted to lock a piece of material on a bench or like support. Fig. 2 is a longitudinal sectional view of the improved device, on the line 2—2 in Fig. 1. Fig. 3 is a transverse sectional view, on the line 3—3 in Fig. 1. Fig. 4 is a view in cross section, on the line 4—4 in Fig. 1; and Fig. 5 is a transverse sectional view, on the line 5—5 in Fig. 1.

The improved bench dog consists of a bottom plate A, of a suitable length and preferably cast from metal, the plate being made wider at one end to permit screw-holes to be formed in it near said end, as indicated by dotted lines in Fig. 1, and also in Fig. 3, for the reception of the screws $a$, that penetrate the bench top B, for the secure retention of the piece A, at a proper point on the bench. Two similar ears $b$, are formed on the upper side of the bottom plate A, near the wider end of said plate, these being raised and bent toward each other so that a suitable space will be afforded between each ear and the bottom plate, as shown in Fig. 3. A proper distance is allowed to intervene the vertical webs of the horizontal ears $b$, for the introduction between them of the locking dog C, that is parallel on its side edges and of such a relative width and thickness as will adapt it to slide freely between and below the ears mentioned.

The bottom plate A is apertured longitudinally at $c$, a proper distance from the ears $b$, toward the opposite end of the plate and in the path of the locking dog C; an integral flange $c'$ being raised from the top surface of the bottom plate, and forwardly extended in alignment with the locking dog which has its rear end bent downwardly and then in parallel with its other portion, so that the depressed end portion $d$ of the dog may be slid through the aperture $c$ and then be located below the flange $c'$, free to longitudinally reciprocate, the flange serving to retain the rear portion of the dog from displacement. The plate A is further secured upon the bench by a screw $d'$, that passes through a hole in the plate near its rear end, as shown by dotted lines in Fig. 1, the two sharpened toes $e$, that project downwardly from the side edges of the plate at its front end, and the similar toe $e'$, in a like manner extended down from its rear edge, serving to reinforce the action of the screws to prevent the plate A, from moving on the bench top B.

A cam lever D, is an essential part of the device, and comprises an elongated flat bar of a length proportioned to suit the other parts of the device, and is preferably bent down at its free rear end. At the other end of the cam lever a circular enlargement is laterally produced, and a curved slot $g$ is formed in this enlargement wherein the headed screw stud $h$ is loosely inserted and engages a threaded hole in the locking dog C, at its transverse center. The cam lever D, is perforated at its center of width above a longitudinal slot $i$, that is produced in the locking bar, said hole and slot being designed to receive the shouldered screw bolt $m$, that has a threaded engagement with a threaded perforation formed in the bottom plate A, at a proper point. The location of the screw-bolt $m$, is at such a point relative to the curved slot $g$, that an eccentric or cam action is produced between the locking dog and lever D, when the latter is swung, so that a limited reciprocation of the dog C, will result when the lever is swung on its fulcrum bolt $m$. Preferably, the forward end $o$ of the dog C, that is to engage the material and hold it, is bent upwardly and then forwardly in parallel with the main body of the dog, so that the front edge which is serrated, will be sufficiently elevated to properly engage with the wooden material that is to be gripped and retained in place on the bench.

In use, the stuff that is to be secured upon the bench top B, is located on the bench, and made to impinge upon an ordinary bench stop (not shown) which is projected from the surface of the top B, at such a point as will locate the opposite edge of the material near to the edge $o$ of the locking dog C, that has previously been retracted by the vibration of the free end of the cam lever D, in the direction of the curved arrow in Fig. 1. When the material is properly placed, the cam lever D, is swung toward the center of the bottom plate A, which will project the serrated end of the dog C into the material, and firmly clamp it upon the bench, a reverse movement of the cam lever retracting the dog and releasing the stuff.

Having thus described my invention, I claim as new and desire to secure by Letters Patent—

1. A bench dog, comprising a bottom plate, a longitudinally slidable locking dog thereon, a vibratile cam curved slotted lever, a bolt loosely engaging this slot and secured to the dog, and a stud loosely engaging the perforation of the lever passing through a longitudinal slot in the dog, and fast in the bottom plate, substantially as described.

2. A bench dog, comprising an elongated bottom plate perforated to receive screws, and having depending toes at the edges, two spaced and raised ears near the front on the bottom plate, a longitudinally slidable locking dog loosely engaging the ears and passing below a raised flange at the rear of the bottom plate, a lever having a curved cam slot and loosely secured above the locking dog, a pivotal connection between the dog and cam lever, and a fulcrum bolt fast in the bottom plate and loose in the dog and lever, substantially as described.

3. The combination, with a bottom plate adapted for attachment by screws upon a bench top, two spaced overhanging and opposite ears on the bottom plate near one end, and a raised flange near the opposite end of said plate above an aperture therein, of a locking dog serrated at one end, slidable between the ears and passing down through the aperture below the flange, and a cam lever curve slotted near one end, pivoted through said slot to the locking dog, and pivoted eccentrically to the curved slot by a headed screw bolt that passes loosely through the cam lever and through a longitudinal slot in the dog into a threaded hole in the bottom plate, substantially as described.

4. The combination, with a bottom plate securable to a bench top, and a raised flange near one end of said plate over an aperture therein, of a slidable locking dog bent at one end to pass down through the aperture and loosely engage with the flange, and a curve slotted cam lever pivoted on the bottom plate through a slot in the dog and loosely secured to the dog by a stud that engages the cam curved slot of the lever, substantially as described.

CHARLES L. BRONK.

Witnesses:
  WM. P. PATTON,
  E. M. CLARK.